United States Patent [19]

Kaltz et al.

[11] Patent Number: 4,626,020
[45] Date of Patent: Dec. 2, 1986

[54] RETRACTABLE VEHICLE BACKLIGHT APPARATUS

[75] Inventors: Milton C. Kaltz, Allen Park; Michael P. Alexander, Grosse Ile, both of Mich.

[73] Assignee: ASC Incorporated, Southgate, Mich.

[21] Appl. No.: 699,784

[22] Filed: Feb. 8, 1985

[51] Int. Cl.$^4$ .............................................. B60J 7/08
[52] U.S. Cl. ..................................... 296/107; 296/147
[58] Field of Search ............... 296/146, 107, 108, 116, 296/117, 147, 148; 49/248

[56] References Cited

U.S. PATENT DOCUMENTS

| | | | |
|---|---|---|---|
| 2,436,728 | 2/1948 | Parsons | 296/146 |
| 2,714,035 | 7/1955 | Limberg et al. | 296/146 |
| 2,747,921 | 5/1956 | Hooverson et al. | 296/146 |
| 2,747,923 | 5/1956 | McLean | 296/146 |
| 2,762,648 | 9/1956 | Huzzard | 296/146 |
| 2,768,024 | 10/1956 | Spear, Jr. | 296/107 |
| 2,836,457 | 5/1958 | Beerman et al. | 296/146 |
| 3,332,169 | 7/1967 | Lohr et al. | 49/249 |
| 3,333,362 | 8/1967 | Kostin et al. | 49/248 |
| 3,536,354 | 10/1970 | Ingram | 296/107 |

*Primary Examiner*—Robert R. Song
*Attorney, Agent, or Firm*—Basile, Weintraub & Hanlon

[57] ABSTRACT

A retractable backlight apparatus for vehicles includes first and second pairs of links, each being pivotally connected at one end to the interior vehicle body structure. The opposite ends of each of the first and second pairs of links are pivotally connected to upper and lower portions, respectively, of frame members attached to the side edges of the backlight panel. A tab is mounted centrally on the bottom portion of the backlight panel to enable the backlight panel to be urged downward from a raised position to a storage position recessed within the interior of the vehicle structure during which movement the first and second pairs of links guide the backlight panel downward into a substantially vertical orientation within the interior of the vehicle. Alternately, a drive motor rotates a pair of transversely extending output shafts, each having a drive gear mounted thereon. The drive gears drive sector gears rigidly attached to the second pair of links to automatically raise and lower the backlight panel. An interlock circuit is provided for preventing operation of the convertible top drive motor whenever the retractable backlight panel is not in the fully lowered position as well as preventing operation of the retractable backlight drive motor whenever the convertible top is not in the fully raised position.

9 Claims, 9 Drawing Figures

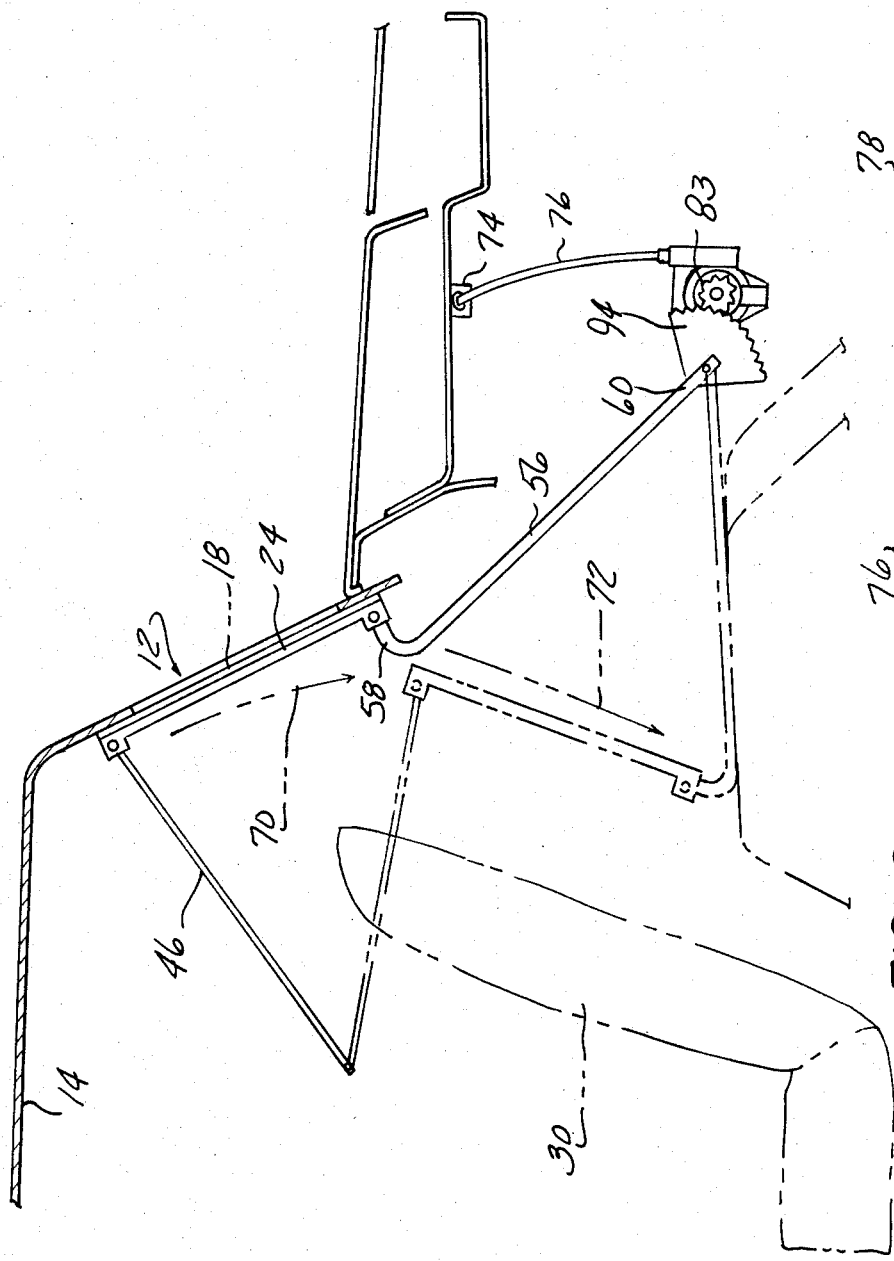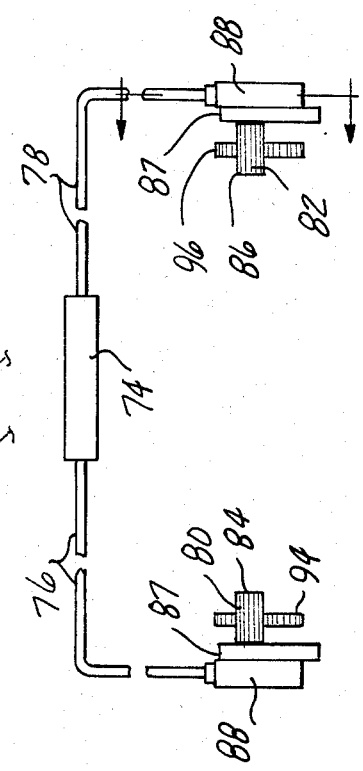

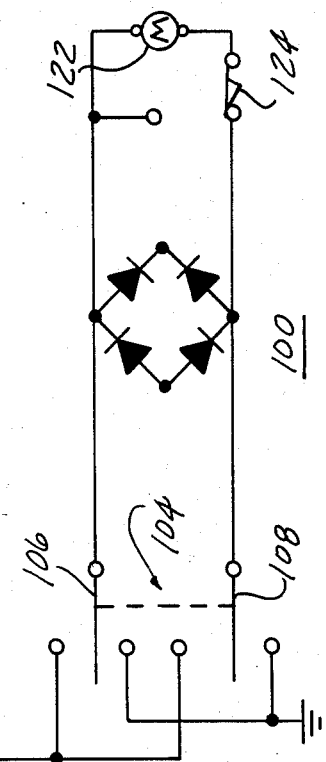
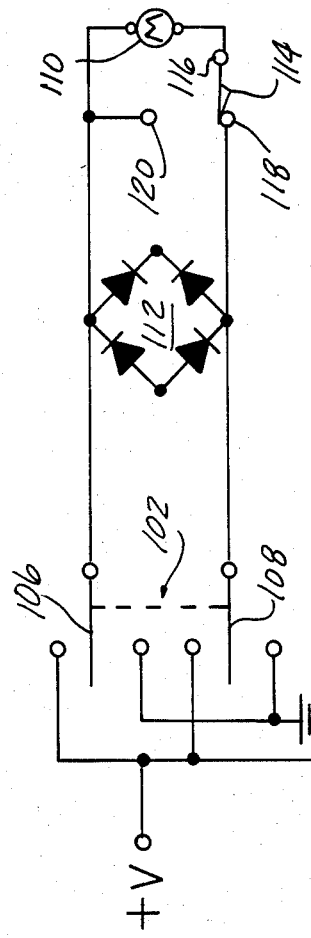
FIG-9
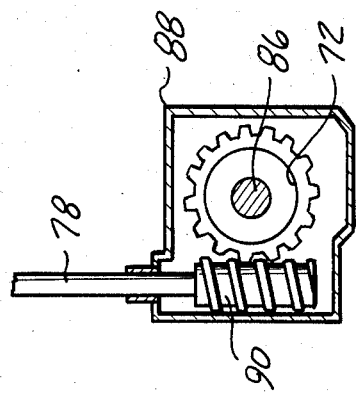
FIG-8

RETRACTABLE VEHICLE BACKLIGHT APPARATUS

BACKGROUND OF THE INVENTION

1. Field of the Invention

This invention relates, in general, to vehicle roof structures and, more specifically, to retractable backlight apparatus for vehicles and, more specifically, to retractable backlight apparatus for vehicles having a foldable, convertible top.

2. Description of the Prior Art

A popular option on vehicles is a convertible top which is movable between a deployed position covering the passenger compartment and a retracted position in which the convertible top is folded and stored behind the rear seat of the vehicle. Such tops are provided with a backlight or rear window for viewing through the rear of the vehicle. In the past, such backlights have been formed of a flexible, transparent plastic material so as to be able to fold and move with the convertible top. However, such plastic backlight panels are susceptible to cracking over long periods of use and frequently cloud or darken which limits viewing to such panels.

In an attempt to overcome the problems encountered with flexible, plastic backlight, rigid plastic and/or glass panels have been mounted in the rear window opening of convertible tops. However, the majority of such rigid panels cannot remain connected with the top when the top is folded and must be manually detached from the convertible top prior to retraction of the top which, at best, is a time consuming and troublesome task. In those convertible top structures in which the backlight remains attached to the convertible top during the raising and retracting movements, the backlight panel must be restricted in size which limits viewing toward the rear of the vehicle.

Other vehicle roof structures have been provided in which a powered, retractable mechanism is mounted within the vehicle and connected to the backlight panel. Such retracting mechanisms, however, utilize numerous components which add to the cost of the vehicle, increase the complexity of the convertible roof structure and consume excessive space within the interior of the vehicle.

Thus, it would be desirable to provide a retractable vehicle backlight apparatus which overcomes the problems encountered with previously devised retractable vehicle backlight apparatus. It would also be desirable to provide a retractable vehicle backlight apparatus in which a large sized backlight panel may be utilized. It would also be desirable to provide a retractable vehicle backlight apparatus which is simply constructed for a low manufacturing cost, minimum space consumption within the vehicle and reliable, longtime operation. Finally, it would be desirable to provide a retractable vehicle backlight apparatus which raises and lowers a rigid backlight panel independently of movement of the vehicle convertible top.

SUMMARY OF THE INVENTION

The present invention is a retractable vehicle backlight apparatus which finds advantageous use in vehicle having a foldable, convertible top. The retractable vehicle backlight apparatus includes first and second pairs of links, each pivotally mounted at one end to the interior vehicle body structure. The second ends of each of the first and second pairs of links are pivotally connected to the upper and lower edges, respectively, of frame members attached to the side edges of the backlight panel.

A tab mounted centrally on the bottom edge of the backlight panel forms a means for urging the backlight panel downward from the raised position in which the backlight panel sealing closes the rear window opening in the vehicle roof structure to a storage position within the interior of the vehicle body. During such movement, the first and second pairs of links guide the backlight panel between the raised position and the substantially vertically oriented storage position.

Alternately, a reversible drive motor rotates two transversely extending drive shafts, each having drive gears mounted on the outer ends. The drive gears mesh with and rotate sector gears rigidly connected to the lower ends of the second links for reversably pivoting the second links to selectively raise and lower the backlight panel.

The retractable backlight panel of the present invention enables a large size backlight panel formed of a rigid material, such as glass, to be utilized in a vehicle, and, in particular, in a vehicle having a foldable convertible top. The retractable backlight apparatus controls movement of the backlight panel between a raised position in which the backlight panel sealingly closes the rear window opening in a vehicle roof and a lowered, storage position in which the backlight panel is oriented in a substantially vertical position within the interior of the vehicle behind the rear seat of the vehicle. This enables the convertible roof to be raised and lowered independently of movement of the backlight panel.

The retractble vehicle backlight apparatus of the present invention is simply constructed with a minimum number of individual components for a low manufacturing cost and simple installation. The retractable vehicle backlight apparatus of the present invention is also provided with manual or power means to effect the desired movement of the backlight panel between the raised and storage positions.

BRIEF DESCRIPTION OF THE DRAWING

The various features, advantages and other uses of the present invention will become more apparent by referring to the following detailed description and drawing in which:

FIG. 6 is a side elevational view of another embodiment of the retractble vehicle backlight apparatus of the present invention;

FIG. 7 is a partial, rear elevational view of the power drive mechanism;

FIG. 8 is a cross sectional view, generally taken along line 8—8 in FIG. 7 showing the drive gear means; and FIG. 9 is a schematic diagram of the backlight and convertible top control circuit.

DESCRIPTION OF THE PREFERRED EMBODIMENTS

Figure 1:
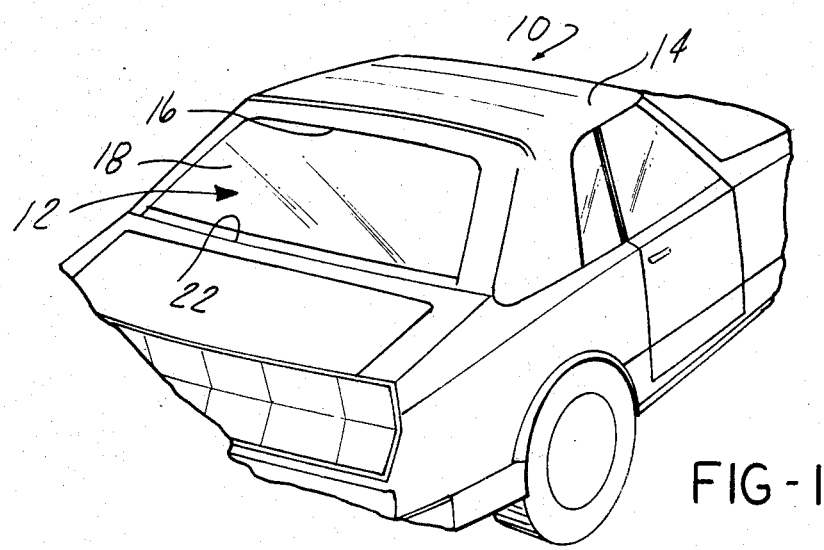
FIG. 1 is a perspective view of a vehicle having a retractable vehicle backlight apparatus constructed in accordance with the teachings of the present invention mounted therein.

Throughout the following description and drawing, an identical reference number is used to refer to the same component shown in multiple figures of the drawing.

Referring now to the drawing, and to FIG. 1 in particular, there is illustrated a vehicle 10 having a retractable backlight apparatus 12 constructed in accordance with the teachings of the present invention mounted therein.

The vehicle 10 includes a roof structure 14 having a rear window opening 16. The roof structure 14 preferably comprises a conventional convertible top formed of a flexible material, such as a vinyl, etc. A conventional linkage and drive mechanism, not shown, is mounted interiorly within the vehicle and is connected to the roof structure 14 so as to selectively raise and lower the roof 14 from a deployed position, shown in FIG. 1, in which the convertible top covers the passenger compartment and a retracted, storage position in which the convertible top 14 is folded and stored within the interior of the vehicle body behind the rear seat of the vehicle 10.

According to a preferred embodiment, the rear window opening 16 in the roof 14 is selectively closed and opened by a retractable backlight apparatus 12 which includes a rigid backlight panel 18. The backlight panel 18, as shown in FIGS. 1-5, comprises a planar sheet of a rigid material, such as transparent glass, plastic, etc. The panel 18 is mounted interiorly within the vehicle 10 and has a shape complimentary to the shape of the rear window opening 16 so as to sealingly close the rear window opening 16 when the backlight panel 18 is in the raised position shown in FIG. 1.

Figure 2:
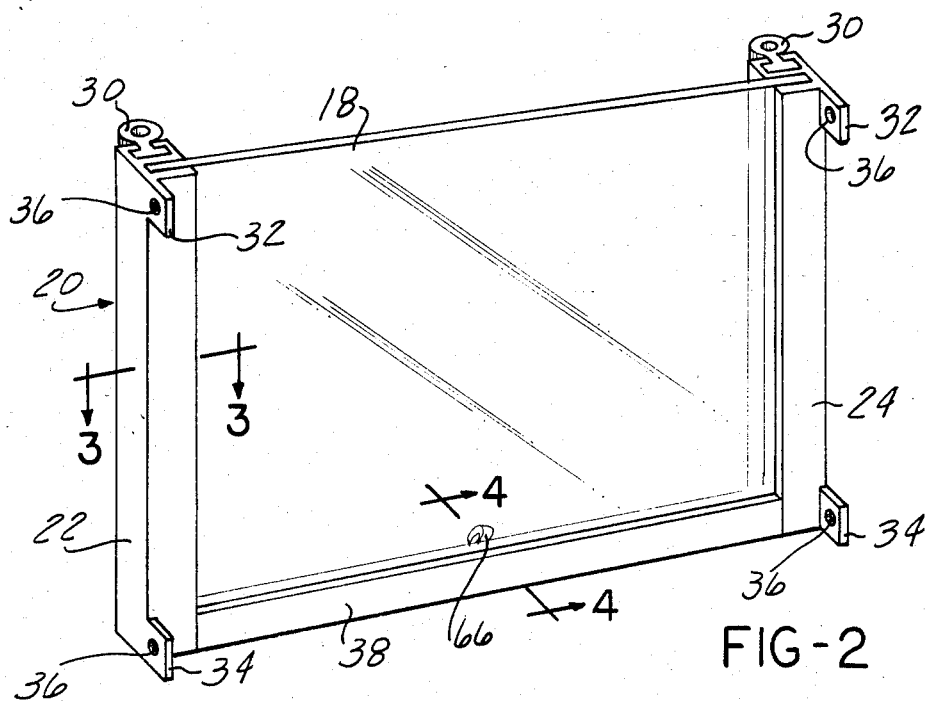
FIG. 2 is a perspective view of one embodiment of the backlight panel of the present invention.
Figure 3:
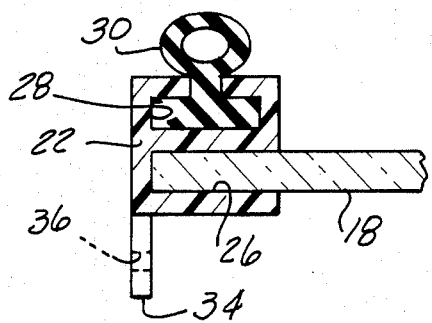
FIG. 3 is a cross sectional view generally taken along line 3—3 in FIG. 2.
Figure 4:
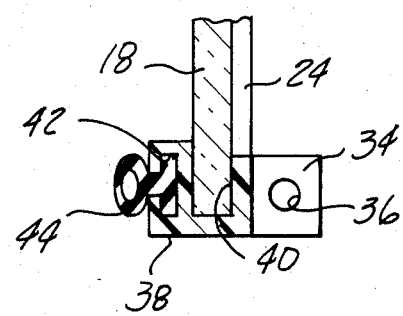
FIG. 4 is a cross sectional view generally taken along line 4—4 in FIG. 2.

The retractable backlight apparatus 12 includes a frame structure denoted in general by reference number 20 in FIG. 2 which surrounds at least the opposed lateral sides and bottom of the panel 18 and rigidly supports the backlight panel 18. The frame structure 20 includes first and second spaced side frame members 22 and 24 which extend vertically along and are seured to opposite edges of the backlight panel 18.

The side frame members 22 and 24 may be formed of any suitable material, such as an extruded plastic or other suitable material. Each of the side frame members 22 and 24 is formed with a first U-shaped channel section 26 which extends along the entire length of the side frame members. The first channel section 26 receives the side edge of the back side panel 18 and is secured thereto by any suitable means, such as by the use of adhesives, fasteners, etc.

The side frame members 22 and 24 also include a second channel section 28 which is formed on the exterior side of the backlight panel 18. The second channel section 28 is configured to receive an elongated sealing member or strip 30. The sealing member or strip 30 includes a portion which extends outward from the side frame member and sealingly engages the edges of the roof structured 14 bounding the rear window opening 16 so as to provide a secure, watertight seal therebetween when the backlight panel 18 is in the raised position.

Upper and lower flanges 32 and 34 are formed on each of the side frame members 22 and 24. Each of the flanges 32 and 34 includes an aperture 36.

The backlight frame 20 also includes a base frame member 38 which extends along and is secured to the bottom edge of the backlight panel 18. The base frame member 38 includes a first U-shaped channel section 40 which securely receives the bottom edge of the backlight panel 18. Suitable adhesives or fasteners may be used to securely connect the first channel section 40 to the bottom edge of the backlight panel 18.

The base frame member 38 also includes a second seal channel section 42 which receives an elongated sealing member or strip 44 therein. The sealing member or strip 44 forms a seal between the bottom edges of the backlight panel 18 and the adjoining body panel structure of the vehicle 10, as shown in FIG. 5, when the backlight panel 18 is in the raised position.

Figure 5:
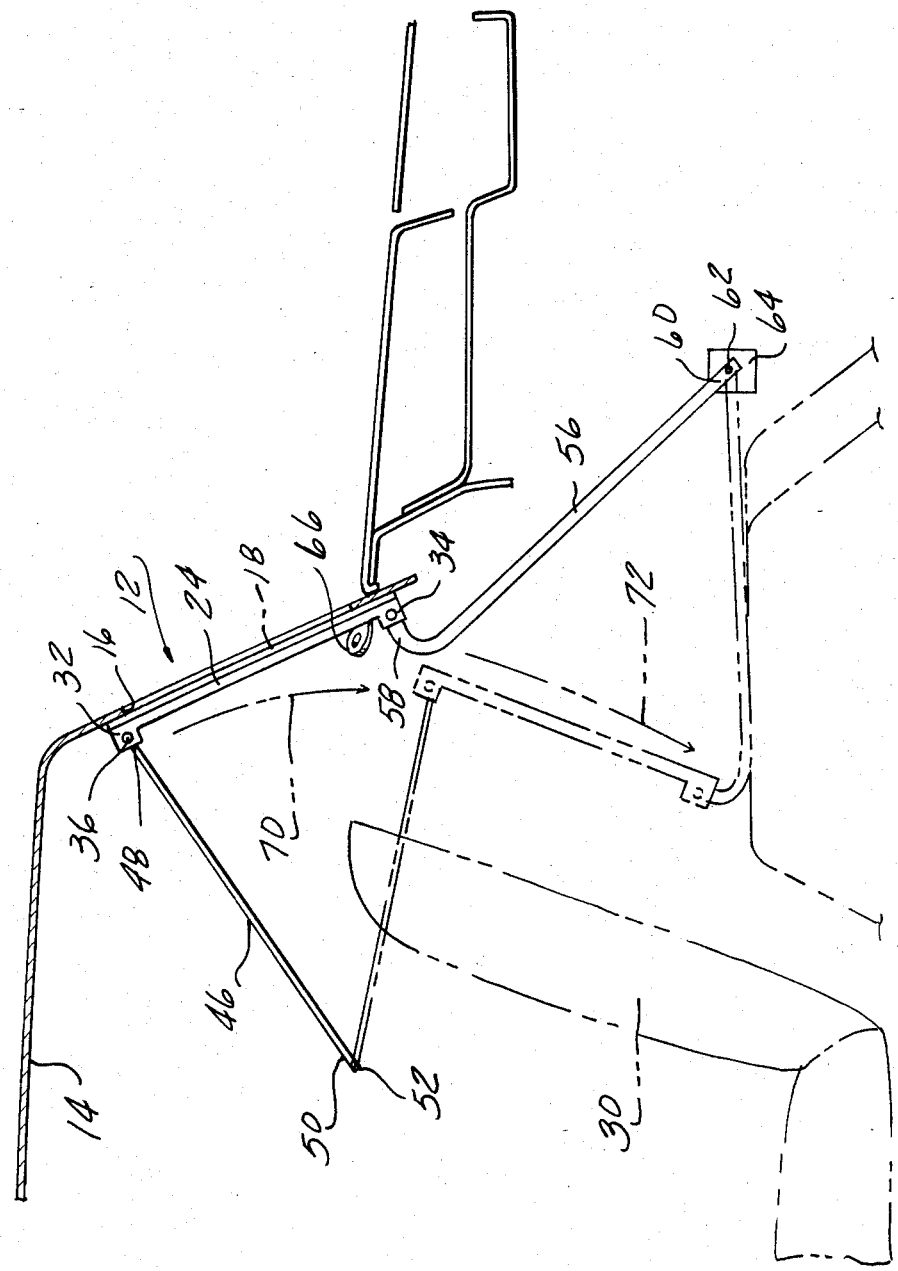
FIG. 5 is a partial, side elevational view showing the retractable vehicle backlight apparatus of the present invention in both the raised and storage positions.

The retractable backlight apparatus 12 also includes first and second pairs of link members, with only the driver side link members being illustrated in FIG. 5. The first pair of links include first and second elongated link members such as link member 46, each having first and second ends 48 and 50, respectively. Each of the links, such as link 46, is in the form of an elongated member having apertures 52 formed in the first and second ends 48 and 50. The first end of each of the links 46 is pivotally connected by suitable fastners to the upper flanges 32 on the side frame members 22 and 24 attached to the backlight panel 18. Suitable pivot connections are inserted through the aligned apertures in the upper flanges 32 and the first end of the links 46.

The second end of each of the links 46 of the first pair of links is pivotally connected to the main pivot bracket of the convertible top linkage mechanism which is mounted on an interior body panel of the vehicle 10 to maintain a fixed dimensional relationship between the convertible top linkage mechanism and the retractable backlight apparatus 12.

The retractable vehicle backlight apparatus 12 also includes a second pair of links including first and second spaced links. Only one link, such as link 56, is shown in FIG. 5. Each of the links 56 has first and second ends 58 and 60, respectively, each having an aperture 62 formed therein. The first end 58 of each link 56 is pivotally connected to the lower flanges 34 on the side frame members 22 and 24 attached to the backlight panel 18. Suitable pivot connections are inserted through the aligned apertures 62 in the first end of each of the links 56 and the apertures 36 in the flanges 34 on the lower ends of the frame members 22 and 24, respectively.

The second end 60 of each of the links 56 is pivotally connected to a suitable mounting bracket 64 attached to the vehicle body structure, as shown in FIG. 5. The mounting bracket 64 may have any suitable configuration and is provided with an aperture for receiving pivot connections for pivotally connecting the second end 60 of each of the links 56 thereto. In this manner, the links 56 pivot about the respective second ends 60.

The retractable backlight apparatus 12 of the present invention is also provided with means, denoted in general by reference number 66, for manually moving the backlight panel 18 between a raised position in which the backlight panel 18 sealingly closes the rear window opening 16, as shown in FIG. 5, to a retracted, storage position shown in phantom in FIG. 5 in which the backlight panel 18 is oreinted is a substantially vertical position within the interior of the vehicle body behind the rear seat 30 of the vehicle 10, thereby opening the rear window opening 16. In one embodiment, as shown in FIG. 5, the moving means 66 comprises a tab. The tab is mounted centrally on the bottom edge of the backlight panel 18 on the interior vehicle side of the backlight panel 18. The tab 66 enables a passenger within the interior of the vehicle 10 to exert manual force on the backlight panel 18 to lower the backlight panel 18 from the raised position shown in FIG. 5 to the storage position shown in phantom in FIG. 5. An upward force exerted on the tab will cause the backlight panel 18 to move upward to the raised position in which the backlight panel 18 sealingly closes the rear window opening 16 in the vehicle roof structure 14. During such raising and lowering movement, the first and second pairs of links, such as links 46 and 56, control the movement of the backlight panel 18 along the dotted paths indicated by reference number 70 and 72 in FIG. 5.

Alternately, the retractable vehicle backlight apparatus 12 of the present invention, may be provided with means for automatically raising and lowering the backlight panel 18 as shown in FIGS. 6 and 7.

The means for raising or lowering the backlight panel 18 includes means for pivoting the second links 56 about their respective second ends 60. The pivoting means preferably comprises a reversible, electrical drive motor 74 which is mounted by suitable brackets, not shown, to the vehicle body structure. The drive motor 74 includes first and second transversely and outwardly extending, rotatable drive shafts 76 and 78, respectively. Although the drive shaft 76 and 78 may be in the form of rigid shafts extending between the motor 74 and the drive mechanism described hereafter, it is preferred that the drive shaft 76 and 78 be in the form of flexible cables mounted in a flexible sheath or housing in order to enable the drive motor 74 to be mounted to the body structure at the top of the vehicle trunk, as shown in FIG. 7.

First and second gear means, denoted in general by reference numbers 80 and 82, are operatively cupled to the first and second drive shafts 76 and 78, respectively, and each of the second links 56 to effect reversible pivoting of the second links 56 upon selective activation of the motor 74. The first and second gear means includes first and second drive gears 80 and 82, respectively.

Each of the first and second drive gears 80 and 82 is mounted on a respective rotatable drive shaft 84 and 86. Each of the drive shafts 84 and 86 extends outward from an identical housing 88 which is attached to the mounting plate 87. Each of the housings 88 is formed with an aperture which receives one end of a flexible cable, such as flexible cable 78 shown in FIG. 8. The end of the flexible cable 78 has a worm gear 90 mounted thereon. The worm gear 90 engages a pinion gear 92 mounted within the housing 98 on the rotatable shaft 86 which rotatably drive in a bi-directional manner the pinion gear 92 depending upon the direction of rotation of the flexible shaft 78.

The rotatable shaft 86 extends outward from the housing 88 through a bracket 87 attached to the surrounding vehicle structure to a second pinion gear 80 and 82, respectively, as shown in FIG. 7. The second pinion gears 80 and 82 drive first and second sector gears 94 and 96 shown in FIGS. 6 and 7. Each of the first and second sector gears 94 and 96 has an arcuate configuration forming a portion of a circular gear. The outer edge of the arcuate shaped sector gears 94 and 96 have gear teeth formed thereon which mesh with the second pinion gears 80 and 82 which are fixably mounted on the rotatable shafts 86 extending outward from the housing 88. A fixed portion of the sector gears 94 and 96 is connected to the second end of the second links for rotating the second links upon bi-directional rotation of the sector gears 94 and 96.

In operation, energization of the drive motor 74 in one direction by one or more manually operable switches, not shown, mounted within the interior of the vehicle 10 will cause clockwise rotation of the drive gears 80 and 82, as viewed in FIG. 6. This will cause the clockwise rotation of the sector gears 84 and 86 and result in a pivoting of the second links 56 about each respective second ends 60. This results in a lowering of the second links 56 accompanied with a descending pivotal movement of the bottom edge of the retractable backlight panel 18 along the dotted line 72 shown in FIG. 6. This downward force exerted on the bottom edge of the backlight panel 18 causes the first pair of links 46 to pivot about their second ends and control a lowering movement of the upper edge of the backlight panel 18 along the dotted path 70 shown in FIG. 6 until the backlight panel 18 has reached the retracted, storage position shown in phantom in FIG. 6. A reverse directional energization of the drive motor 74 causes the drive gears 80 and 82 and the sector gears 84 and 86 to rotate in a counterclockwise direction to raise the second links 56. Through the interconnection of the second links 56, the rigid backlight panel 128 and the first links 46, the backlight panel 18 will move to the raised position in which the backlight panel 18 sealingly closes the rear window opening 16.

The retractable vehicle backlight apparatus 10 of the present invention also includes interlocks means for positively controlling the operation of the backlight panel apparatus and the convertible top drive mechanism.

The interlock means includes first and second switch means 102 and 104, respectively, which preferably comprise toggle switches having first and second movable contacts 106 and 108, respectively, which are movable upon switching of the toggle switch means 102 and 104 between first and second positions. Terminals provided at each of the first and second positions are connected alternately to a source of a voltage (+V), such as the battery of the vehicle 10 and ground. Thus, depending upon the direction of switching of the contacts 106 and 108, a voltage of positive or negative polarity may be applied to the circuit.

The contacts 106 and 108 of the toggle switch 102 are connected to opposite sides of a first motor 110 which is operable for driving the retractable backlight vertically so as to raise and lower the retractable backlight as described above. A conventional rectifying bridge circuit 112 is connected between the contacts 106 and 108 for rectifying the input power to the motor 110. A limit switch 114 is provided which is movable between first and second positions. The limit switch 114 is positioned to detect the full closure of the convertible top 14 of the vehicle 10, that is, when the top 14 has reached its fully raised position covering the vehicle opening. In a normal position, the light switch 114 is positioned between first and second terminals 116 and 118 which are connected to the circuit to provide a voltage to the motor depending upon the position of the toggle switch 102. The limit switch 114 assumes the normal position shown in FIG. 9 only when the convertible top 14 is in the fully raised position. Whenever the top 14 is away from the fully closed position, the limit switch 114 assumes the second position between terminals 116 and 120 thereby shunting the motor 110 and preventing its operation. This insures that the retractable backlight of the present invention is operated only when the convertible 14 is in the fully raised position thereby preventing any possibility of damage to the retractable backlight mechanism and/or glass panel 18 mounted therein.

A similar interlock circuit is also employed to control the operation of a second motor 122 which powers the convertible top drive linkage in a conventional manner. The contacts 106 and 108 of the second toggle switch 104 are connected in a similar manner as the contacts of the toggle switch 102 between a positive voltage source, such as the battery of the vehicle and ground so as to provide a voltage of positive or negative polarity to the second motor 122 to reversably drive the second motor 122 in the desired direction to raise or lower the convertible top 14. A second limit switch 124 is provided in this circuit and is switchable between first and second positions. The second limit switch 124 is positioned in the vehicle 10 to detect a fully lowered position of the retractable backlight. In normal operation, the second limit switch 124 will assume the position shown in FIG. 9 when the retractable backlight is in the fold down position to thereby permit a voltage to be applied to the motor 122 through the toggle switch 104 to raise and lower the convertible top 14.

However, whenever the retractable backlight has moved or is not positioned in its fully retracted position, the second limit switch 124 switches to an alternate position shunting the second motor 122 and preventing movement of the convertible top linkage until the retractable backlight has been lowered to the fully lowered position.

A similar circuit is provided in the manual version of the present invention shown in FIG. 5 insofar as including the lower drive circuit shown in FIG. 9. The limit switch 124 is provided for detecting the position of the manually operable backlight so as to prevent operation of the convertible top drive linkage motor 122 when the manual backlight panel is not in the fully lowered position.

In summary, there has been disclosed an unique retractable vehicle backlight apparatus which finds particular advantageous use in a vehicle having a foldable convertible top. The retractable backlight apparatus of the present invention is effective to independently move a large size, rigid backlight panel independent from the movement of the convertible top. This enables a backlight panel having a size much larger than previously possible to be mounted within a vehicle having a convertible top for improved vision toward the rear of the vehicle. Furthermore, the rigid backlight panel is safely stowed within the interior of the vehicle prior to the retraction and extension movements of the convertible top.

The retractable backlight apparatus of the present invention is designed for movement independent from movement of the convertible top. This enables a backlight panel having an overall visible area much larger than previously possible to be mounted within a vehicle having a convertible top. Furthermore, the rigid backlight panel is safely stowed within the interior of the vehicle prior to the retraction and extension movements of the convertible top. The retractable backlight apparatus of the present invention is simply constructed of a minimum number of components for a low manufacturing cost, ease of installation and long term reliability.

What is claimed is:

1. A retractable backlight apparatus for a vehicle having a roof structure with a rear window opening comprising:
    a rigid, movable, backlight panel for closing the rear window opening in the vehicle roof structure;
    a first pair of links, each having first and second ends, the first ends of each of the first pair of links being pivotally connected to spaced upper portions of the backlight panel, the second ends of the first pair of links being pivotally connected to stationary portions of the vehicle, the first pair of links being pivotally movable about the second ends from a first raised position and a second lowered, substantially horizontal position,
    a second pair of links, each having first and second ends, the first ends of each of the second pair of links being pivotally connected to spaced lower portions of the backlight panel, the second ends of the second pair of links being pivotally connected to stationary portions of the vehicle, the second pair of links being pivotally movable about the second ends from a first raised position to a second lowered, substantially horizontal position, in corporation which the first pair of links, to dispose the backlight panel in a substantially vertical orientation within the interior of the vehicle in the lowered position; and
    means for moving the backlight panel between the first raised position closing the window opening in the vehicle roof structure and the second storage position.

2. The retractable backlight apparatus of claim 1 wherein the means for moving the backlight panel comprises:
    a tab mounted on the backlight panel to effect manual movement of the backlight panel.

3. The retractable backlight apparatus of claim 2 wherein the tab is mounted centrally on the bottom portion of the backlight panel.

4. The retractable backlight apparatus of claim 1 wherein the means for moving the backlight panel comprises:
    means for pivoting the second links about their respective second ends.

5. The retractable backlight apparatus of claim 4 wherein the pivoting means comprises:
    drive means having first and second reversibly rotatable drive shafts; and
    first and second gear means coupling the first and second drive shafts to the lower ends of the second links, respectively.

6. The retractable backlight apparatus of claim 5 wherein the first and second gear means includes:
    a first gear fixedly secured on the end of each of the second links; and
    a second gear mounted on the outer ends of each of the first and second drive shafts and meshingly engaging and driving the associated first gear to effect reversible pivoting of the second links.

7. The retractable bcklight apparatus of claim 5 wherein the drive means comprises a reversible electric motor.

8. The retractable backlight apparatus of claim 5 wherein the vehicle includes a reversable drive motor for raising and lowering the convertible top of the vehicle and wherein the retractable backlight apparatus further includes:

interlock means for permitting operation of the convertible top drive motor only when the retractable backlight panel is in the fully lowered position, and for permitting the retractable backlight panel to be raised and lowered only when the convertible top is in the fully raised position covering the vehicle opening.

9. The retractable backlight apparatus of claim 8 wherein the interlock means comprises:

first and second switch means connected to the drive means of the retractable backlight and the convertible top drive motor for connecting voltage of opposed polarities to the drive motors to reversably drive the motors in a pre-determined direction;

third switch means mounted on the vehicle for detecting when the retractable backlight panel is in the fully lowered position, the third switch means being connected to short out the convertible top drive motor whenever the retractable backlight panel is not in the fully lowered position; and fourth switch means mounted on the vehicle for detecting the fully raised position of the convertible top, the fourth switch means being connected across the retractable backlight drive means to short out the retractable backlight drive means whenever the convertible top is not in the fully raised position thereby preventing operation of the retractable backlight drive means.

* * * * *